Oct. 13, 1959
N. H. RUDOLPH ET AL
2,908,416
ELECTRICAL BOXES
Filed Oct. 22, 1958
2 Sheets-Sheet 1
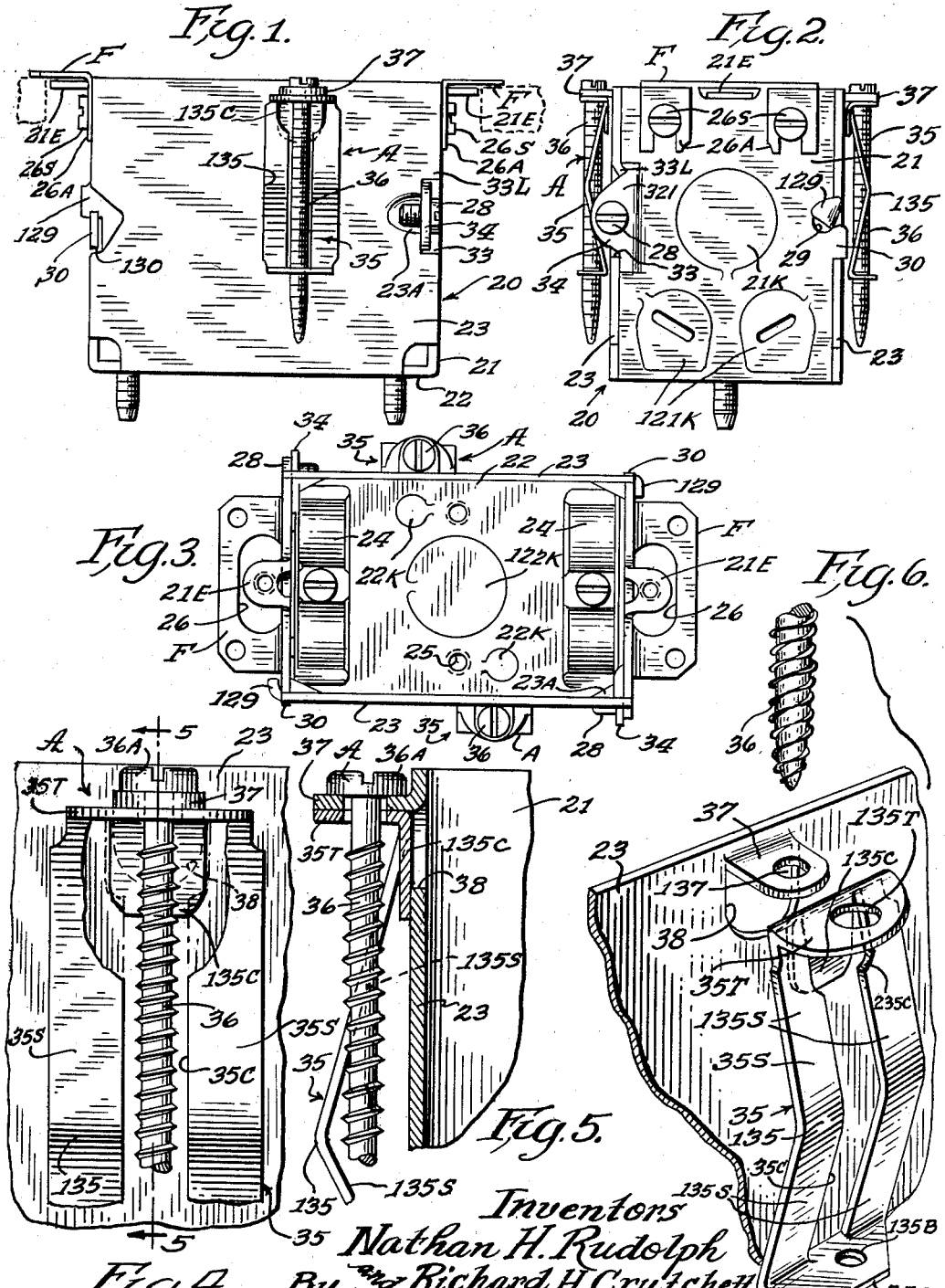
Inventors
Nathan H. Rudolph
and Richard H. Crutchett
By Mann, Brown and McWilliams,
Attys.

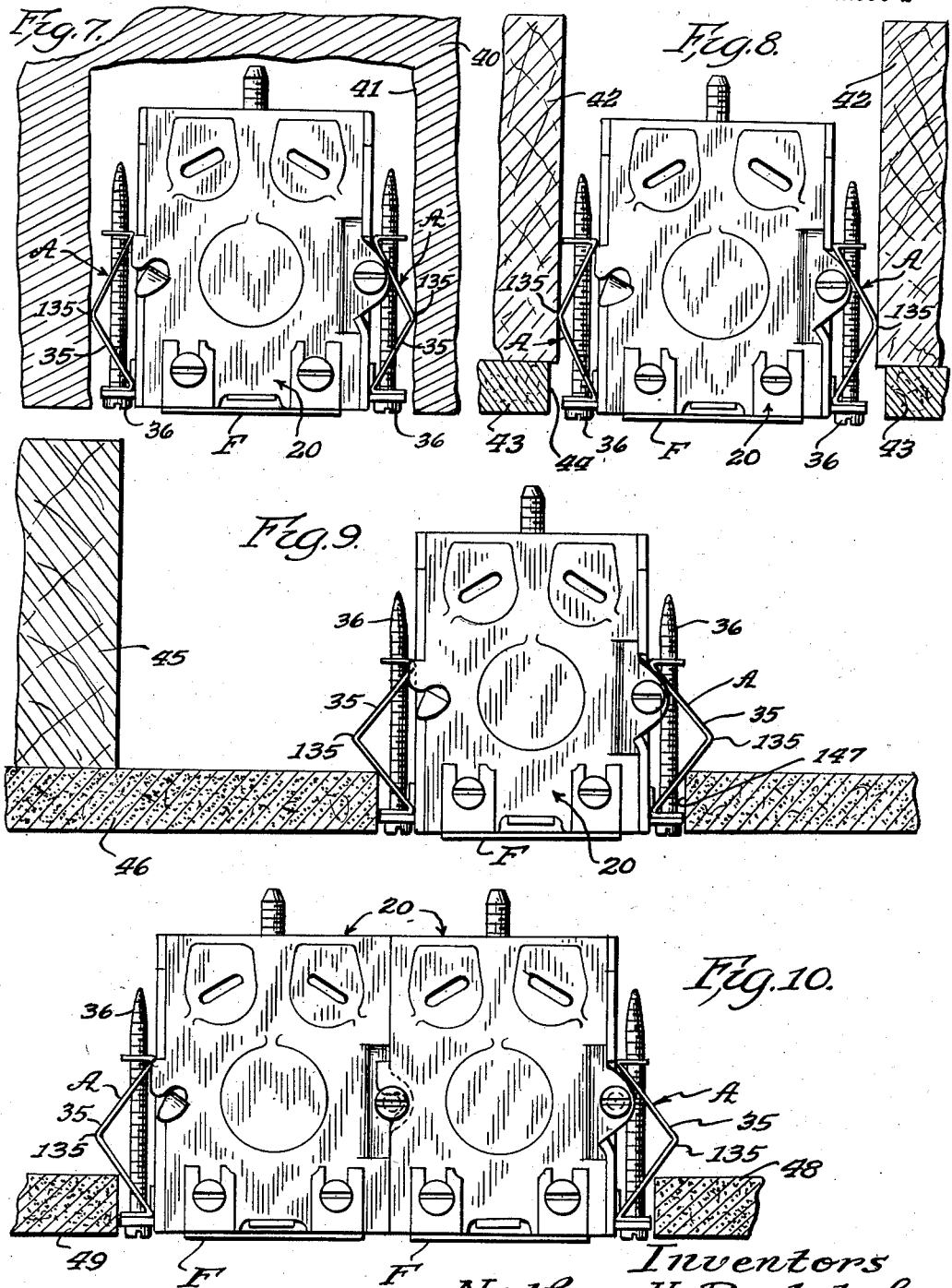

United States Patent Office 2,908,416
Patented Oct. 13, 1959

2,908,416

ELECTRICAL BOXES

Nathan H. Rudolph and Richard H. Crutchett, Aurora, Ill., assignors to All-Steel Equipment, Inc., a corporation of Illinois Application October 22, 1958, Serial No. 768,909

7 Claims. (Cl. 220—3.6)

This invention relates to electrical boxes of the character that are adapted for use as switch boxes or outlet boxes.

Electrical boxes of the aforesaid character must be mounted in position in a wall, and many different types of securing devices have been provided in the past for enabling this to be accomplished. One troublesome situation in connection with the use of boxes of this kind is encountered where the box must be installed in an existing wall and in such instances it is customary to cut a recess or opening in the wall so that the box may be inserted into the wall to the desired position. When located in the desired position, it is necessary to render clamping or holding means operative to maintain the box in position, and such holding means in situations of this kind must be capable of operation from the front of the box.

Various kinds of fastening or securing means have been proposed and used for this purpose, some of which are located within the box and are projected outwardly through the walls of the box in the course of a fastening operation, while other fastening means have been located on the outer sides of the walls of the box for operation by a screw or the like extending from the forward edge of the box rearwardly along the outer face of the wall of the box.

One such securing device is shown in Wood Patent No. 2,083,415, patented June 7, 1937 and in this clamp an operating screw is extended through the end positioning flange of the box downwardly along the outer face of the box and is associated with a deformable metal member that may be deformed by operation of the screw so as to engage the rear surface of the thin wall member such as a plasterboard. This deformable clamp of the Wood patent has a limited field of use and has been considered unsatisfactory in other respects, one of which is concerned with the location of the clamp at the end of the box in association with the end positioning flange, and because this end positioning flange must be cut out in its central portion to provide clearance for the usual end lug that is used in securing a cover or a switch bracket in place, the structure of the Wood patent must use two deformable clamps at each end of the box, thus to crowd the end areas of the box with mechanism and make it necessary to actuate four operating screws in order to secure the box in position in a wall. The Wood clamping action is attained through an outward swinging movement of the operating screw in the course of the clamping operation, and this results in difficult operation of the screw coupled with an inefficient application of the forces to the deformable clamping member.

In view of the foregoing it is an important object of the invention to provide an electrical box having deformable clamps of an improved and simplified form, and a related object is to so form and construct such clamping devices that they are held firmly in place against the box by the screw that serves also as the operating means.

Another object of the invention is to provide such a box having simple and economical clamping or anchoring means that may be effectually utilized in a wide variety of mounting situations.

A further object of the present invention is to provide an electrical box having deformable clamps in association with the side walls of the box, and an object related to the foregoing is to provide an electrical box in which deformable clamp may be operated through and securing deformation while the operating screw remains in its original relationship parallel to the wall of the box. Further and related objects are to provide a deformable clamp for securing outlet boxes in place in which the deformation of the clamps results in outward projection of the clamp member in a V-shaped form such that the clamp may be readily used in an effective manner upon many different types of wall structures, and to provide such a clamp wherein the clamping forces applied by the deformable clamps react against the outer face of the box at spaced points.

Other and further objects of the present invention will be apparent from the following description and claims, and are illustrated in the accompanying drawings, which, by way of illustration, show a preferred embodiment of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

Fig. 1 is a side elevational view of an electrical box embodying the features of the invention;

Fig. 2 is an end elevational view of the box;

Fig. 3 is a plan or front face view of the box;

Fig. 4 is an enlarged fragmental portion of Fig. 1;

Fig. 5 is a fragmental sectional view taken along the line 5—5 of Fig. 4;

Fig. 6 is an enlarged fragmental perspective view showing the elements of one of the anchoring devices in separated relationship;

Fig. 7 is a sectional view showing the installation of the box in a recess formed in a solid or masonry wall;

Fig. 8 is a view of the box installed between two closely spaced studs;

Fig. 9 is a sectional view of the box installed in a thin wall structure such as that provided by plasterboard; and Fig. 10 is a view showing two boxes assembled in a ganged or multiple relationship and installed in a plasterboard wall.

For purposes of disclosure the invention is herein illustrated as embodied in an electrical box 20 of rectangular form made from sheet metal and having integral end and bottom walls 21 and 22 and with detachable side walls 23, and at the upper ends of the end walls 21 projecting positioning flanges F are provided for engaging a wall surface in the mounting of the box, while on the respective side walls 23, anchoring devices are provided for engaging the wall structure to hold the box in position.

The end walls 21 have knockouts 21K located in generally central positions to receive conduit connection, while near the lower edges of the end walls 21, pairs of knockouts 121K are provided through which armored or non-metallic sheathed cable may be extended into association with clamps 24 located within the box adjacent the ends of the box. The bottom wall 22 has screw openings 25 and additional screw openings may be provided by knockouts 22K. Additionally, a large knockout 122K is provided centrally of the bottom wall 22 to receive a conduit connection. Centrally of the upper edges of the end walls 21 out-turned ears 21E are provided to receive the mounting switch brackets, covers or the like on the box. The flanges F are in the forms of adjustable end brackets and the flange F has a cut-out 26 therein to provide clearance space for the ears 21E. The flange F projects at right angles from the end wall 21 and slotted mounted arms 26A on the inner edge of the flange are held adjustably in position against the end wall 21 by screws 26S.

The flanges F normally serve to engage the outer face of a wall to limit the inward position or extent of movement of the box 20 with respect to a wall, and by adjustment of the flanges F this position or location may be varied to some extent.

The detachable mounting of each of the side walls 23 is in the present instance provided by a system of lugs and notches held in engagement by a single screw 28. Thus each side wall 23 is made of such a size that it overlaps or engages the edges of the bottom wall 22 and both end walls 21, and one end wall 21 has a projecting lug 29 and an adjacent downwardly slanted notch 30 which may be engaged respectively by a notch 130 and a somewhat twisted lug 129. The notch 130 is formed in the corresponding end of the side wall 23, and immediately adjacent to the notch 130, the lug 129 projects from such end of the side wall 23. The twisting of the lug 129 serves to match the lug 129 generally with the slope of the notch 29 so that the lower edge of the lug 129 engages the lower edge of the notch 29, and preferably the twisting of the lug 121 is carried to such an extent that an upper edge portion of the lug overlaps and engages the outer surface of the end wall 21 to a slight extent to thus initially hold the side wall in the proper endwise location during assembly.

At its other end the side wall 23 has a notch 33 formed therein to receive an arcuately shaped projecting lug 34 that is formed on an inwardly offset portion 321 of the outer end wall 21. At the upper edge of the notch 33, the metal of the side wall 23 is formed to provide an angular lug 33L that overlaps and engages the outer surface of the portion 321 of the end wall 21. The screw 28 is threaded through the lug 34 in a position such that as the screw 28 is screwed through the lug, its end engages a depressed and somewhat angular portion 23A of the side wall 23 to hold the side wall 23 against the edge of the adjacent end wall 21.

The screw 28 is aligned with the notch 29 and since the lug 34 is carried on the offset wall 321 as described, this enables the box to be used in multiple or in gangs to provide a greater internal volume, as will be described.

The anchoring devices A that are carried on the respective side walls 23 are of such a construction that they may be economically produced and assembled, and in use the anchoring devices A enable the box 20 to be readily and securely mounted in a wide variety of different wall structures, as will be described. The anchoring devices A are displaced somewhat from the midpoints of the side walls 23 in order that a more advantageous anchoring or clamping action may be attained where the box is mounted in wood lath and plaster walls. Each anchoring device A comprises an elongated deformable anchor plate 35 extending downwardly along and close to its side wall 23 and an associated mounting and operating screw 36 carried on the side wall 23. The screw 36 is preferably of the self-threaded type that is usually termed a sheetmetal screw, and has a flat, binder-type head 36H, and the screw extends downwardly along the wall 23 through a laterally projecting supporting ear 37 formed by outward striking of the metal of the wall 23. The ear 37 is located near the upper edge of the wall 23 so that the opening 38 from which the lug 37 has been struck is located directly beneath the base of the lug as will be evident particularly in Figs. 5 and 6 of the drawings.

The anchor plate 35 is provided as a simple and economical sheet metal stamping having a pair of elongated parallel strips 35S, spaced laterally from each other to provide a central or intermediate clearance space 35C, and connected together at their ends by integral bottom and top flanges 35B and 35T. The flanges 35B and 35T are bent in the same direction from the strips 35S so that the flanges are substantially parallel, and the strips 35S are bent at 135 at substantially their midpoints so that in side elevation, as viewed in Fig. 2, the anchor plate 35 has the general appearance of flat or wide letter M.

The anchor plate 35 is positioned against the outer surface of the side wall 23 with the top flange 35T directly beneath the ear 37, and the screw 36 is extended loosely through openings 137 and 135T formed respectively in the ear 37 and the flange 35T. The screw 36 is then projected on downwardly through the clearance space 35C and is threaded into an opening 135B formed in the bottom flange 35B, and the screw is tightened until the upper flange 35T is held firmly against the lower face of the ear 37. In such tightening of the screw 36, the strips 35S of the anchor plate 35 are placed under a slight endwise compression tending to further bend the strips 35S at 135, and this results in a spring-like tensioning of the strips 35 which holds the lower end of the anchor plate 35 firmly against the face of the side wall 23, and holds the flange 35T firmly against the ear 37 so that the anchor plate 35 extends substantially parallel to the end edges of the side wall 23. The anchor plate 35 is thus securely held in the desired relation during handling and initial positioning or mounting of the box 20, and the screw 36 has its head 36H in position for convenient operation of the anchoring device. In such operation of the anchoring devices A the screw 36 is further tightened so as to draw the lower flange 35B upwardly, and this bends the central portions of the anchor strips 35S outwardly toward the general form shown in Figs. 7 to 10, and it is by such outward bending of the anchoring strips 35S that the box 20 is anchored in its position of use, as will be described in greater detail hereinafter.

It will be noted in Fig. 6 of the drawings that the formation of the mounting ear 37 results in the production of a sizable opening 38 in the side wall 23, and to minimize the total open area of the box, the anchoring plate 35 is so formed as to permanently cover the opening 38. Thus, as best shown in Figs. 4 to 6, a portion of the metal that is displaced in forming the clearance space 35C is formed as a cover flange 135C that projects downwardly at right angles from the base of the upper flange 35T. The cover flange 135C is made just slightly wider than the opening 38 and this is accomplished by widening the upper end portion of the clearance space 35C, as indicated at 235C in Fig. 6; and the length of the cover flange 135C is made such that the flange extends downwardly beyond the lower edge of the opening 38.

In the anchoring device that is thus provided, the anchoring strips 35S may each be said to be divided into two pressure applying struts 135S that are connected with each other in a bendable fashion at 135 and are connected in a bendable relationship at their opposite ends with the top and bottom flanges 35T and 35B. The sheet metal material from which the anchoring plate 35 is made is sufficiently strong to cause the struts 135S to remain unbent during any normal use of the anchoring device so that as the bottom flange 35B is drawn upwardly by operation of the screw 36, the only bending that normally will take place is at the line 135 and at the points of juncture of the opposite ends of the strips 35S with the top and bottom flanges 35T and 35B. Hence, in the operation of the anchoring device, the angular or bending points 135 are progressively moved outwardly away from the wall 23 with the struts 135S cooperating to form a projecting V, while the ends of the anchoring plate 35 constantly remain in contact with the wall 23. As a result, forces that may be applied where required by engagement of the bending points 135 with a wall structure, in which instance the anchoring action may be by a penetrating action or may be frictional in character, while in other instances, where the box is being mounted in relatively thin walls, some intermediate point on the anchoring strips 35S between the bending line 135 and the flange 35T moves into engagement with an inner portion of a wall structure in which the box 20 is being mounted. In either instance, the innermost ends of the anchoring strips 35S remains in contact with and reacts against the wall 23.

In Figs. 7 to 10 inclusive, several different types of wall structures have been illustrated with electrical boxes of the present invention mounted therein. Thus, in Fig. 7 of the drawings, a solid wall 40 has been illustrated that may be of concrete or masonry, and a mounting recess 41 has been illustrated as being cut into the wall. This mounting recess is of a size such that the box 20 may be inserted therein to the extent determined by the locating flanges F, and after the box has been positioned, the screws 36 are tightened so that the anchoring strips 35S are bent outwardly to engage the points 135 thereof with opposite sides of the recess 41. The tightening of the screws is carried to such a point that substantial forces are applied outwardly against the sides of the recess 41 so that the box 20 will be held firmly in position.

In Fig. 8 the box 20 is illustrated as being mounted between a pair of relatively closely spaced studs 42 that are faced by means such as plasterboard 43. An opening 44 is cut in the plasterboard 43 through which a box 20 is inserted to the extent determined by the flanges F, and the screws 36 are then tightened to project the points 135 of the anchoring device outwardly and into firm contact with the adjacent faces of the studs 42.

In Fig. 9 of the drawings the box of the present invention is illustrated as being associated with a wall that has studs 45 and a plasterboard facing 46, and a mounting opening 147 is shown as being cut through the plasterboard 46 at a point that is spaced from the closest stud 45. The box 20 is inserted through the opening 147 to engage the flanges F with the outer face of the plasterboard 46, and the screws 36 are then tightened so as to project the points 135 of the anchoring device laterally. In this instance, however, the points 135 of the anchoring strips 35S are disposed a considerable distance rearwardly of the rear surface of the plasterboard 46 so that the screws 36 are tightened to such an extent that intermediate portions of the anchoring strips are engaged with the inner corners of the opening 147, as shown in Fig. 10, or where relatively thin board is being used as the wall covering, the anchoring strips may be further distorted so as to engage the back surface of the board in many instances. This operation thus serves to provide for a clamping action against inner or rear portions of the plasterboard whereby the flanges F are held against the outer surface of the plasterboard.

In Fig. 10 of the drawings a similar plasterboard 48 has been illustrated as constituting a wall in which two interconnected or ganged boxes 20 are disposed within an opening 49 formed in the plasterboard 48. In this instance of course the two boxes 20 are interconnected to provide an internal volume double that of a single box, and nevertheless, anchoring devices A are provided on the opposite side walls 23 that define the opposite sides of the double-volume box. These anchoring devices A are operated in the same manner as the anchoring devices described in connection with Fig. 9 so that the double-volume or ganged box structure is securely anchored in place in the wall.

From the foregoing description it will be apparent that the present invention provides an improved electrical box wherein mounting or anchoring means that are operable from the forward face of the box are of such a character that the box may be mounted in a wide variety of wall structures. It will also be apparent that the electrical box of this invention has the necessary mechanism and particularly the anchoring means and the positioning lugs distributed about the walls of the box so that manufacture and mounting are facilitated.

It will also be apparent that the present invention provides a new and improved clamp that is simple in character and may be economically manufactured, and further it may be apparent that the forces applied by the operating screw in the anchoring means of this invention are applied with great efficiency so that an adequate clamping or securing action is assured.

Thus while a preferred embodiment of the invention has been illustrated herein, it is to be understod that changes and variations may be made by those skilled in the art without departing from the spirit and scope of the appending claims.

We claim:

1. An open faced electrical box, having a bottom and walls associated with said bottom to define said open face, locating flanges on opposite ones of said walls for engaging the surface of a wall structure to locate the box relative thereto, mounting ears projecting outwardly from the outer faces of two other opposite ones of said walls near said open face, operating screws projecting loosely through the respective ears along the related walls, elongated anchoring plates each comprising a pair of elongated anchoring strips spaced apart laterally to provide an elongated clearance space therebetween and connected together at their ends by top and bottom flanges, said anchoring plates being associated with the respective screws with the screws projecting loosely through their top flanges, through the clearance spaces and with the respective screws threaded through their bottom flanges, said strips being bent outwardly near their midpoints so as to be spaced from the walls on which they are mounted while the ends of the strips are located in contact with such walls.

2. An open faced electrical box, having a bottom and side and end walls associated with said bottom to define said open face, locating flanges on said end walls for engaging the surface of a wall structure to locate the box relative thereto, mounting ears projecting outwardly from the outer faces of said side walls near said open face, operating screws projecting loosely through the respective ears along said side walls, elongated anchoring plates each comprising a pair of elongated anchoring strips spaced apart laterally to provide a clearance space therebetween and connected together at their ends by top and bottom flanges, said anchoring plates being associated with the respective screws with the screws projecting loosely through their top flanges, through the clearance spaces and with the respective screws threaded through the related bottom flanges, and strips being bent outwardly near their midpoints so as to be spaced from the side walls while the ends of the strips are located in contact with such walls.

3. An electrical box according to claim 2 wherein said ears are struck from the metal of said side walls so as to leave openings located between the ears and the bottom of the box, and wherein said anchor plates have cover flanges formed thereon in position to close said openings.

4. In a device of the character described, means including four right angularly related walls and a bottom cooperating to form an open faced box, one of said walls having a mounting ear struck outwardly therefrom so as to project outwardly from the outer face of such wall near the open face, an elongated anchor plate made from sheet metal to provide parallel anchor strips having a clearance space therebetween and joined at their ends by top and bottom flanges that project in substantially parallel relation and in the same direction from the opposite ends of the strips, said strips being bent outwardly in said direction at corresponding points intermediate their ends, said anchor plate being disposed against said outer face of said one wall with said top flange engaging said ear and the junctures of the flanges and strips engaging said one wall so as to thereby locate said bent points of said strips in spaced relation to said one wall, an operating screw extended loosely and rotatably through said ear and said upper flange and then through said clearance space into threaded engagement with said bottom flange.

5. In an open faced electrical box having a bottom and walls associated with said bottom to define said open face, a mounting ear projecting outwardly from the outer face of one of said walls near said open face, an operating screw projecting loosely through the ear and along said wall, an elongated anchoring plate comprising a pair of elongated anchoring strips spaced apart laterally to provide a clearance space therebetween and connected together at their ends by top and bottom flanges, said anchoring plates being associated with the screw with the screw projecting loosely through said top flange, through the clearance space and with the screw threaded through said bottom flanges, and strips being bent outwardly near their midpoints so as to be spaced from the wall while the ends of the strips are located in contact with such wall.

6. An electrical box according to claim 5 wherein said ear is struck from the metal of said one of said walls so as to leave an opening located between the ear and the bottom of the box, and wherein said anchor plate has a cover flange formed thereon in position to close said opening.

7. An anchoring plate for electrical boxes comprising an elongated one-piece sheet metal member with a longitudinal central slot cut therein and terminating in spaced relation with respect to the ends of the member, said member being bent to a flat M-shaped form to provide generally parallel end flanges located at the ends of said slots, the portions of the member intermediate said flanges providing straight strut elements the juncture of which is located substantially midway between the free ends of the flanges, a portion of the material cut from one end of the slot being extended at right angles to the adjacent flange and toward the corresponding end of the other flange to provide a cover member.

References Cited in the file of this patent

UNITED STATES PATENTS

| | | |
|---|---|---|
| 1,817,772 | Sipe | Aug. 4, 1931 |
| 2,446,014 | Larson | July 27, 1948 |
| 2,491,742 | Lein | Dec. 20, 1949 |